(12) United States Patent
Ilan et al.

(10) Patent No.: US 8,898,540 B1
(45) Date of Patent: Nov. 25, 2014

(54) COUNTER UPDATE THROUGH ATOMIC OPERATION

(75) Inventors: Dan Ilan, Herzellia (IL); Adi Habusha, Moshar Alonee-Abba (IL); Noam Mizrahi, Modi'in (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 911 days.

(21) Appl. No.: 13/074,817

(22) Filed: Mar. 29, 2011

Related U.S. Application Data

(60) Provisional application No. 61/321,403, filed on Apr. 6, 2010.

(51) Int. Cl.
 *G11C 29/00* (2006.01)
 *G06F 11/20* (2006.01)
 *G06F 11/10* (2006.01)
 *G06F 9/38* (2006.01)

(52) U.S. Cl.
 CPC .......... *G06F 11/2053* (2013.01); *G06F 11/106* (2013.01); *G06F 9/382* (2013.01); *G06F 9/3853* (2013.01)
 USPC .......................................... 714/763; 714/6.13

(58) Field of Classification Search
 CPC ..................................................... G06F 11/2053
 USPC .................................................. 714/763, 6.13
 See application file for complete search history.

(56) References Cited

U.S. PATENT DOCUMENTS

| | | | | |
|---|---|---|---|---|
| 7,334,179 | B2 * | 2/2008 | Zhang et al. | 714/764 |
| 7,516,371 | B2 * | 4/2009 | Sakaue et al. | 714/52 |
| 7,877,666 | B2 * | 1/2011 | Crawford et al. | 714/763 |
| 7,987,407 | B2 * | 7/2011 | Gille et al. | 714/764 |
| 8,238,207 | B2 * | 8/2012 | Nagai | 369/47.2 |
| 8,335,960 | B2 * | 12/2012 | Zhang et al. | 714/752 |
| 2010/0195393 | A1 * | 8/2010 | Eggleston | 365/185.09 |
| 2011/0047408 | A1 * | 2/2011 | Gille et al. | 714/6 |

* cited by examiner

*Primary Examiner* — Esaw Abraham

(57) ABSTRACT

Some of the embodiments of the present disclosure provide a system-on-chip (SOC) that includes a plurality of processing cores; and a counter update module configured to atomically update a counter that is stored in a storage location, based on a counter update command received from a processing core of the plurality of processing cores; generate an ECC for the updated value of the counter; and write the updated value of the counter and the ECC to the storage location. Other embodiments are also described and claimed.

13 Claims, 4 Drawing Sheets

COUNTER UPDATE THROUGH ATOMIC OPERATION

CROSS REFERENCE TO RELATED APPLICATIONS

The present application claims priority to U.S. Patent Application No. 61/321,403, filed Apr. 6, 2010, the entire specification of which is hereby incorporated by reference in its entirety for all purposes, except for those sections, if any, that are inconsistent with this specification.

TECHNICAL FIELD

Embodiments of the present disclosure relate to updating counters in general, and more specifically, to updating counters in a computer system through atomic operations.

BACKGROUND

Unless otherwise indicated herein, the approaches described in this section are not prior art to the claims in the present disclosure and are not admitted to be prior art by inclusion in this section.

In a computing system, a counter is generally used to keep count of a number of times a particular event or process has occurred. For example, a counter can keep count of a number of data packets received by a network router from a remote host during a network session. A counter is generally stored in a memory location of a memory, and additionally, can also be stored in a cache.

SUMMARY

In various embodiments, the present disclosure provides a system-on-chip (SOC) comprising a plurality of processing cores; and a counter update module configured to atomically update a counter that is stored in a storage location, based on a counter update command received from a processing core of the plurality of processing cores; generate an error correction code (ECC) for the updated value of the counter; and write the updated value of the counter and the ECC to the storage location. In an embodiment, there is also provided a method comprising issuing, by a first processing core of a plurality of processing cores, a counter update command to update a counter; if the counter is cached in a cache location of a cache data array, updating, by a first counter update and ECC generation module, the counter based on the counter update command; and if a counter is not cached in the cache data array, updating, by a second counter update module, the counter based on the counter update command.

In an embodiment, there is also provided a SOC comprising a plurality of processing cores including a first processor configured to issue a counter update command for updating a counter; a cache module comprising a cache data array that is shared among one or more of the plurality of processing cores; a first component configured to update the counter based on the counter update command, if the counter is cached in a cache location of the cache data array; and a second component configured to update the counter based on the counter update command, if the counter is not cached in the cache data array.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is noted that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
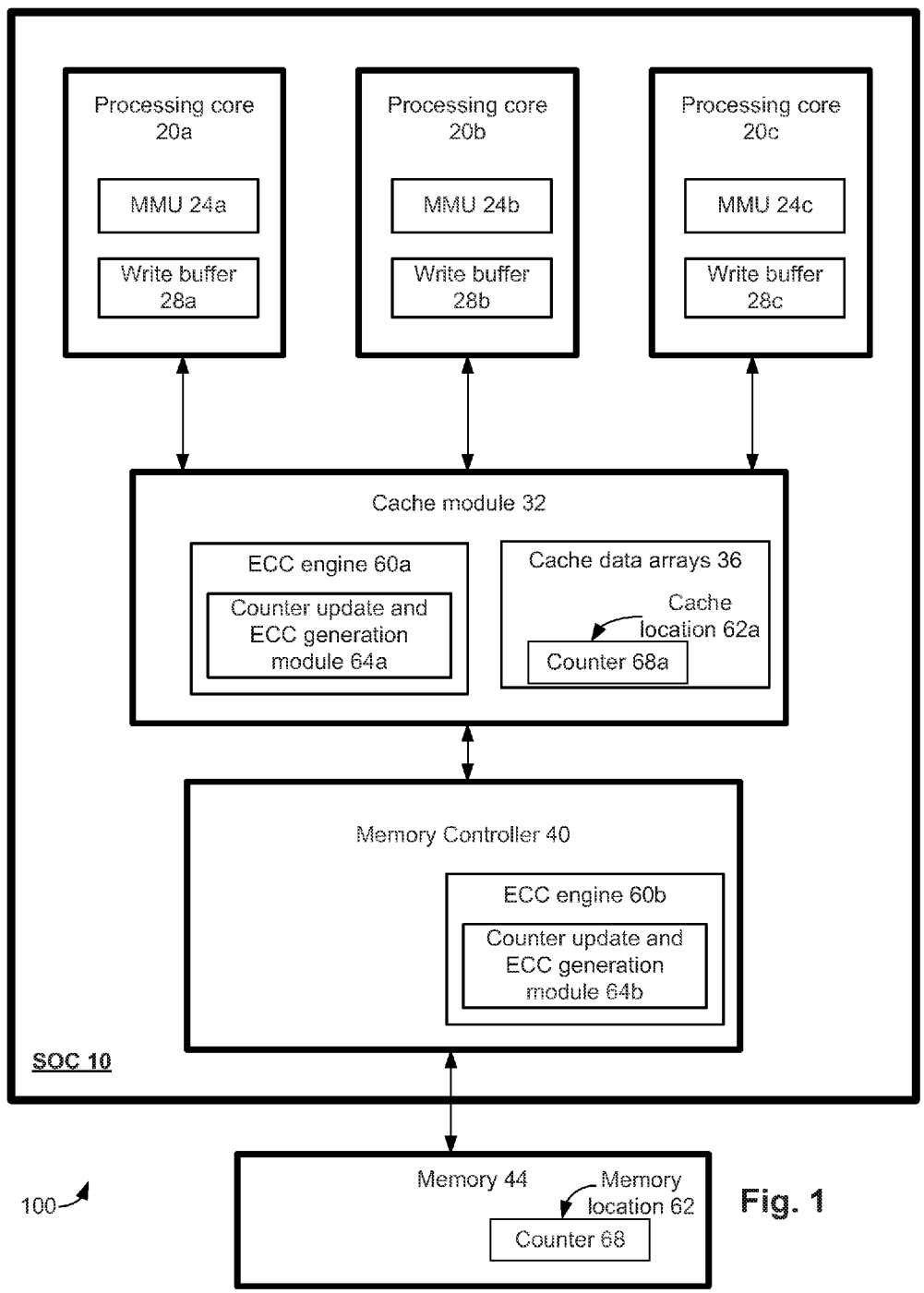
FIG. 1 schematically illustrates a computing system that includes a system-on-chip comprising a first counter update module and a second counter update module, in accordance with an embodiment of the present disclosure.

FIG. 1 schematically illustrates a computing system 100 that includes a system-on-chip (SOC) 10 comprising a counter update and ECC generation module 64a (henceforth referred to herein as counter update module 64a) and a counter update and ECC generation module 64b (henceforth referred to herein as counter update module 64b), in accordance with an embodiment of the present disclosure. The SOC 10 includes three processing cores, i.e., processing cores 20a, 20b and 20c, although in another embodiment, the SOC 10 can include any other suitable number (e.g., one, two, four, etc.) of processing cores.

As will be discussed in more detail herein later, in an embodiment, the counter update module 64a (and/or the counter update module 64a) updates a counter that is stored in a storage location (e.g., a shared cache or a memory location), based on a counter update command received from a processing core of the plurality of processing cores 20a, ..., 20c; generates an ECC for the updated value of the counter; and writes the updated value of the counter and the ECC to the storage location. In an embodiment, the updating of the counter, the generation of the ECC, and the writing of the updated value of the counter and the ECC are performed atomically by the counter update module 64a (e.g., one or more of the processing cores cannot access the counter while the counter update module 64a performs these operations to update the counter).

Referring again to FIG. 1, each of the processing cores 20a, 20b and 20c includes a memory management unit (MMU) and a write buffer. For example, processing core 20a includes MMU 24a and write buffer 28a, processing core 20b includes MMU 24b and write buffer 28b, and processing core 20c includes MMU 24c and write buffer 28c.

For each of the processing cores, the corresponding MMU (e.g., MMU 24a of the processing core 20a) translates one or more virtual addresses, generated by the processing core, to corresponding physical addresses. That is, the MMU performs virtual address to physical address translation for the corresponding processing core.

For each of the processing cores, the corresponding write buffer (e.g., write buffer 28a of the processing core 20a) buffers data that are to be written by the processing core to, for example, a cache or an external memory.

The SOC 10 further includes a cache module 32. The cache module 32 is a shared cache module, in other words a cache module that is shared among processing cores 20a, . . . , 20c. In an embodiment, cache module 32 is a level 2 (L2) cache module. The cache module 32 includes cache data array 36 configured to cache data that are received from, and/or transmitted to the processing cores 20a, 20b, and/or 20c.

In an embodiment, the cache module 32 also includes an error correction code (ECC) engine 60a, which, among other functions, generates and/or verifies ECC of data that is transmitted from, and/or transmitted to the cache module 32. The ECC engine 60a comprises the counter update module 64a.

The SOC 10 also includes a memory controller 40 that is operatively coupled to, and configured to control a memory 44. In an embodiment, the memory controller 40 is configured to receive read and/or write instructions for the memory 44 from the one or more components (e.g., from the cache module 32), and translate the received instructions in a format that is compatible with the memory 44. The memory controller 40 acts as an interface between the memory 44 and various other components of the system 100. As illustrated in FIG. 1, in an embodiment, the memory 44 is external to the SOC 10, although in other embodiments, the memory 44 is internal to the SOC 10.

The memory controller 40 also includes an ECC engine 60b, which, among other functions, generates and/or verifies ECC of data that is transmitted from, and/or transmitted to the memory controller 40. The ECC engine 60b comprises the counter update module 64b.

Although the SOC 10 includes several other components (e.g., a communication bus, one or more peripherals, interfaces, and/or the like), these components are not illustrated in FIG. 1 for the purpose of illustrative clarity.

The memory 44 stores, among other data, a counter 68 in a memory location 62. The counter 68 is used, for example, to keep count of a number of times a particular event or process has occurred. As an example, the counter 68 keeps count of a number of data packets stored in a data packet queue that is associated with an appropriate component (e.g., a network router, not illustrated in FIG. 1) of the SOC 10. In other embodiments, the counter 68 can be used to keep count of any other appropriate event or process.

In an embodiment, the cache data array 36 can also store a cached value of the counter 68, which is labeled as counter 68a in FIG. 1. A cache location (e.g., a cache line or a cache page in one of the cache data array 36), which caches the counter 68a, is labeled as cache location 62a in FIG. 1. Although not illustrated in FIG. 1, in an embodiment, the counter 68 may not be cached in the cache data array 36 (e.g., the counter 68a may not be available in the cache data array 36, the counter 68a may be dirty, i.e., not synchronized with the counter 68, etc.).

In an embodiment, one or more of the processing cores 20a, . . . , 20c are N bit processing cores (where N is an appropriate positive integer). For example, one or more internal registers, address buses, data buses, etc. of the processing cores 20a, . . . , 20c are N bit wide. In an embodiment, the counter 68 is an M bit counter (where M is an appropriate positive integer). In an embodiment, M is greater than N (e.g., N=32 and M=64).

The counter 68 (or the cached counter 68a) needs to be updated (e.g., incremented, decremented, current counter value replaced with a new value, etc.) periodically by one or more of the processing cores 20a, 20b, and/or 20c. For example, as a number of data packets in the data packet queue associated with the counter 68 increases, the counter 68 has to be incremented accordingly. Similarly, as the number of data packets in the data packet queue decreases, the counter 68 has to be decremented accordingly. In an embodiment, the counter is updated responsive to an operation performed, e.g., at one of the processing cores 20a, . . . , 20c (or at any other component(s) of the SOC 10).

In an embodiment, the counter 68 (or the counter 68a) is updated by one of the counter update module 64a and the counter update module 64b, based at least in part on whether the counter 68 is cached in the cache data array 36.

For example, one of the processing cores 20a, . . . , 20c issues a counter update command for updating the counter 68. If the counter 68 is cached in the cache module 32 (i.e., if the counter 68a is available in the cache location 62a), the counter update module 64a of the ECC engine 60a receives the counter update command from the processing core, reads a current value of the counter 68a from the cache data array 36, modifies the current value of the counter 68a to generate an updated value of the counter 68a, generates an ECC for the updated value of the counter 68a, and writes the updated value of the counter 68a, along with the ECC, to the cache location 62a.

In another example, if the counter 68 is not cached in the cache data array 36 and if the counter 68 is stored in the memory location 62 of the memory 44, the counter update module 64b of the ECC engine 60b receives the counter update command from the processing core, reads a current value of the counter 68 from the memory location 62, modifies the current value of the counter 68 to generate an updated value of the counter 68, generates an ECC for the updated value of the counter 68, and writes the updated value of the counter 68, along with the ECC, to the memory location 62.

Figure 2:
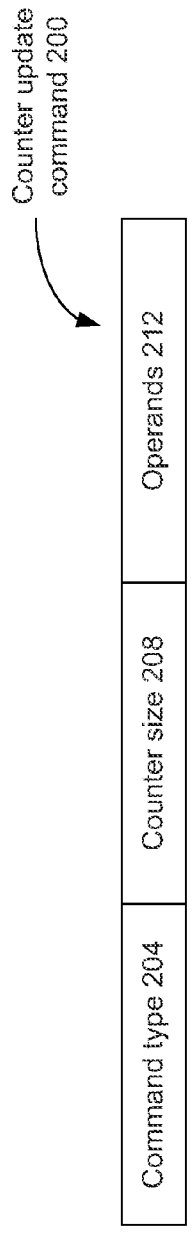
FIG. 2 schematically illustrates a counter update command, in accordance with an embodiment of the present disclosure.

FIG. 2 schematically illustrates a counter update command 200, in accordance with an embodiment of the present disclosure. The counter update command 200 is issued by, for example, any one of the processing cores 20a, . . . , 20c. For example, the processing core 20a issues the counter update command 200 to update the counter 68. If the counter 68 is cached in the cache data array 36, the cached counter 68a in the cache location 62a is updated by the counter update module 64a based on the counter update command 200. On the other hand, if the counter 68 is not cached in the cache data array 36, the counter 68 in the memory location 62 is updated by the counter update module 64b based on the counter update command 200.

Referring again to FIG. 2, the counter update command 200 includes a command type 204, which indicates a type of update operation to be carried out on the counter 68. In an example, the counter update command 200 is issued to increment the counter (e.g., add an increment value to the current value of the counter 68) or to decrement the counter (e.g., subtract a decrement value from the current value of the counter 68). In another example, the counter update command 200 is issued so that the current value of the counter 68 is replaced with a replacement value. In yet another example, the counter update command 200 is issued so that the current value of the counter 68 is compared with a threshold value, and based on the comparison, the current value of the counter is either left unchanged or replaced with another replacement value. Accordingly, the command type 204 indicates an increment operation, a decrement operation, a replacement operation, a compare and replacement operation, or any other appropriate operation to update the counter 68.

The counter update command 200 also includes a counter size 208, which indicates a size of the counter 68. As an example, the counter size 208 being 00 can indicate that the counter 68 is a 32 bit counter, the counter size 208 being 01 can indicate that the counter 68 is a 64 bit counter, the counter size 208 being 10 can indicate that the counter 68 is a 128 bit counter, and so on.

The counter update command 200 also includes operands 212. For example, if the command type 204 indicates an increment operation, the operands 212 include the increment value that is to be added to the current value of the counter 68. In another example, if the command type 204 indicates a decrement operation, the operands 212 include the decrement value that is to be subtracted from the current value of the counter 68. In yet another example, if the command type 204 indicates a replacement operation, the operands include the replacement value by which the current value of the counter 68 is to be replaced. In another example, if the command type 204 indicates a compare and replacement operation, the operands include the threshold value with which the current value of the counter 68 is to be compared, and also include the another replacement value by which the current value of the counter 68 is to be possibly replaced (e.g., selectively replaced based on the comparison results). In an embodiment, the operands 212 can include any other appropriate type of operands associated with the counter update command 200.

Figure 3A:
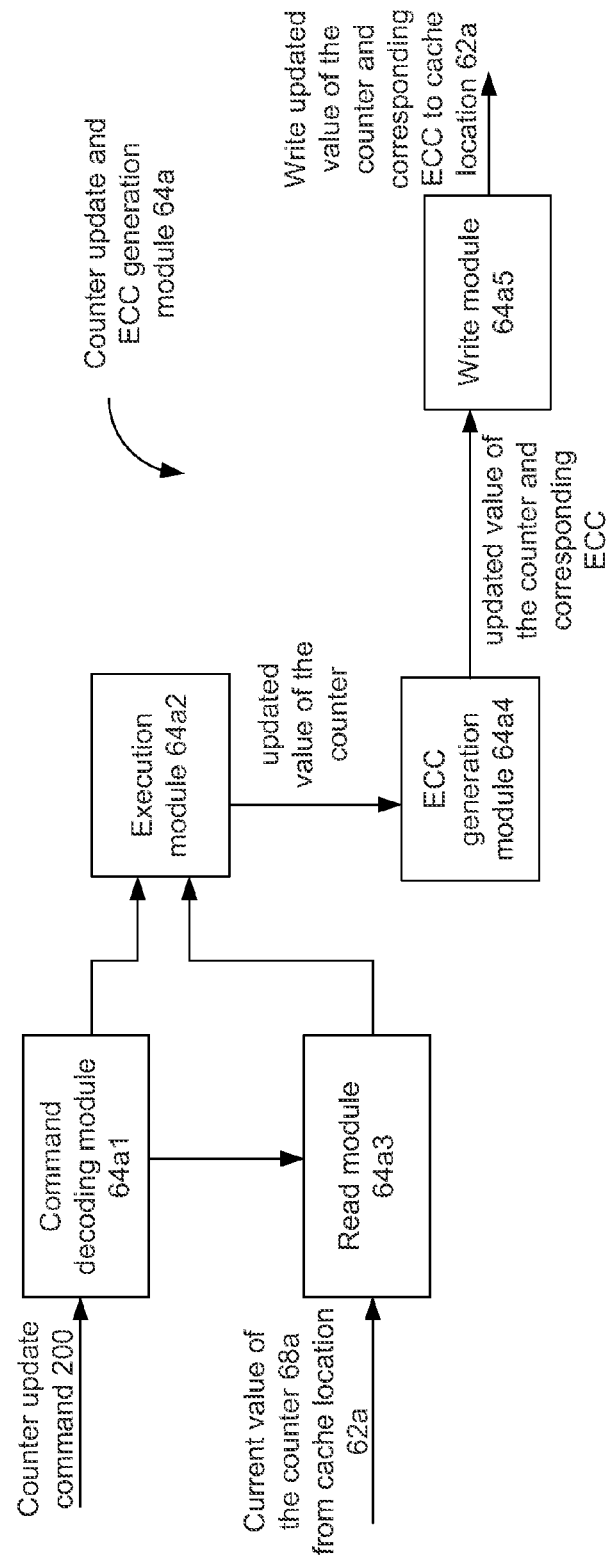
FIG. 3a schematically illustrates the first counter update module included in a error correction code (ECC) engine of a cache module of FIG. 1, in accordance with an embodiment of the present disclosure.

FIG. 3a schematically illustrates the counter update module 64a included in the ECC engine 60a of the cache module 32 of FIG. 1, in accordance with an embodiment of the present disclosure. The counter update module 64a includes a command decoding module 64a1, which is configured to receive the counter update command 200 from one of the processing cores 20a, ..., 20c. In the case the counter 68 is cached in the cache data array 36 (i.e., if the cached counter 68a is available), the command decoding module 64a1 processes the counter update command 200. For example, the command decoding module 64a1 decodes the counter update command 200, and determines the command type 204, the counter size 208, and the operands 212 of the counter update command 200.

The counter update module 64a also includes a read module 64a3. Based on receiving the counter update command 200, the command decoding module 64a1 instructs the read module 64a3 to read the counter 68a from the cache location 62a. Accordingly, the read module 64a3 reads the current value of the counter 68a from the cache location 62a.

The counter update module 64a also includes an execution module 64a2. The execution module 64a2 receives the decoded counter update command 200 from the command decoding module 64a1 (e.g., receives the command type 204, the counter size 208, and the operands 212 of the counter update command 200 from the command decoding module 64a1). The execution module 64a2 also receives the current value of the counter 68a from the read module 64a3.

In an embodiment, based at least in part on the decoded counter update command 200 from the command decoding module 64a1 and the current value of the counter 68a from the read module 64a3, the execution module 64a2 modifies the current value of the counter 68a to generate an updated value of the counter 68a. That is, the execution module 64a2 performs the update operation on the current value of the counter 68a, based at least in part on the counter update command 200.

The counter update module 64a also includes an ECC generation module 64a4, which is configured to receive the updated value of the counter 68a from the execution module 64a2. The ECC generation module 64a4 generates an ECC for the updated value of the counter 68a.

The counter update module 64a also includes a write module 64a5, which receives the updated value of the counter 68a and the corresponding ECC, and writes the updated value of the counter 68a and the corresponding ECC to the cache location 62a (and/or to any other appropriate cache location).

Figure 3B:
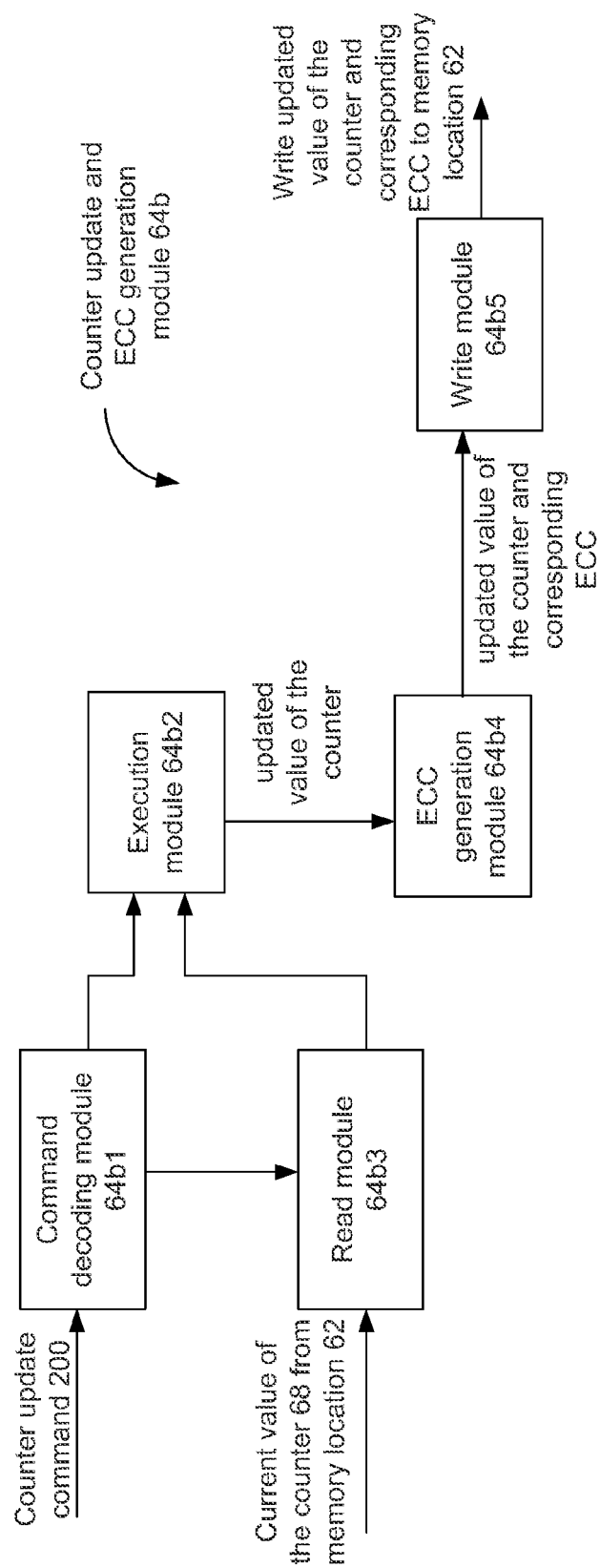
FIG. 3b schematically illustrates the second counter update module included in a ECC engine of the memory controller of FIG. 1, in accordance with an embodiment of the present disclosure.

FIG. 3b schematically illustrates the counter update module 64b included in ECC engine 60b of the memory controller 40 of FIG. 1, in accordance with an embodiment of the present disclosure. Individual components of the counter update module 64b in FIG. 3b is at least in part similar to corresponding components of the counter update module 64a of FIG. 3a. For example, the counter update module 64a includes a command decoding module 64b1, a read module 64b3, an execution module 64b2, an ECC generation module 64b4, and a write module 64b5, which are at least in part similar to the command decoding module 64a1, read module 64a3, execution module 64a2, ECC generation module 64a4, and the write module 64a5, respectively of FIG. 3a.

In an embodiment, the counter update module 64b in FIG. 3b operates at least in part similar to the counter update module 64a of FIG. 3a. However, unlike the counter update module 64a, in the counter update module 64b, the current value of the counter 68 is read from the memory location 62 located in memory 44 and the updated value of the counter 68 is written to the memory location 62.

Thus, if the counter 68 is cached in the cache data array 36 (i.e., if the cached counter 68a is available), the counter update module 64a of FIG. 3a updates the cached counter 68a. On the other hand, if the counter 68 is not available in the cache data array 36, the counter update module 64b of FIG. 3b updates the counter 68 in the memory location 62.

Figure 4:
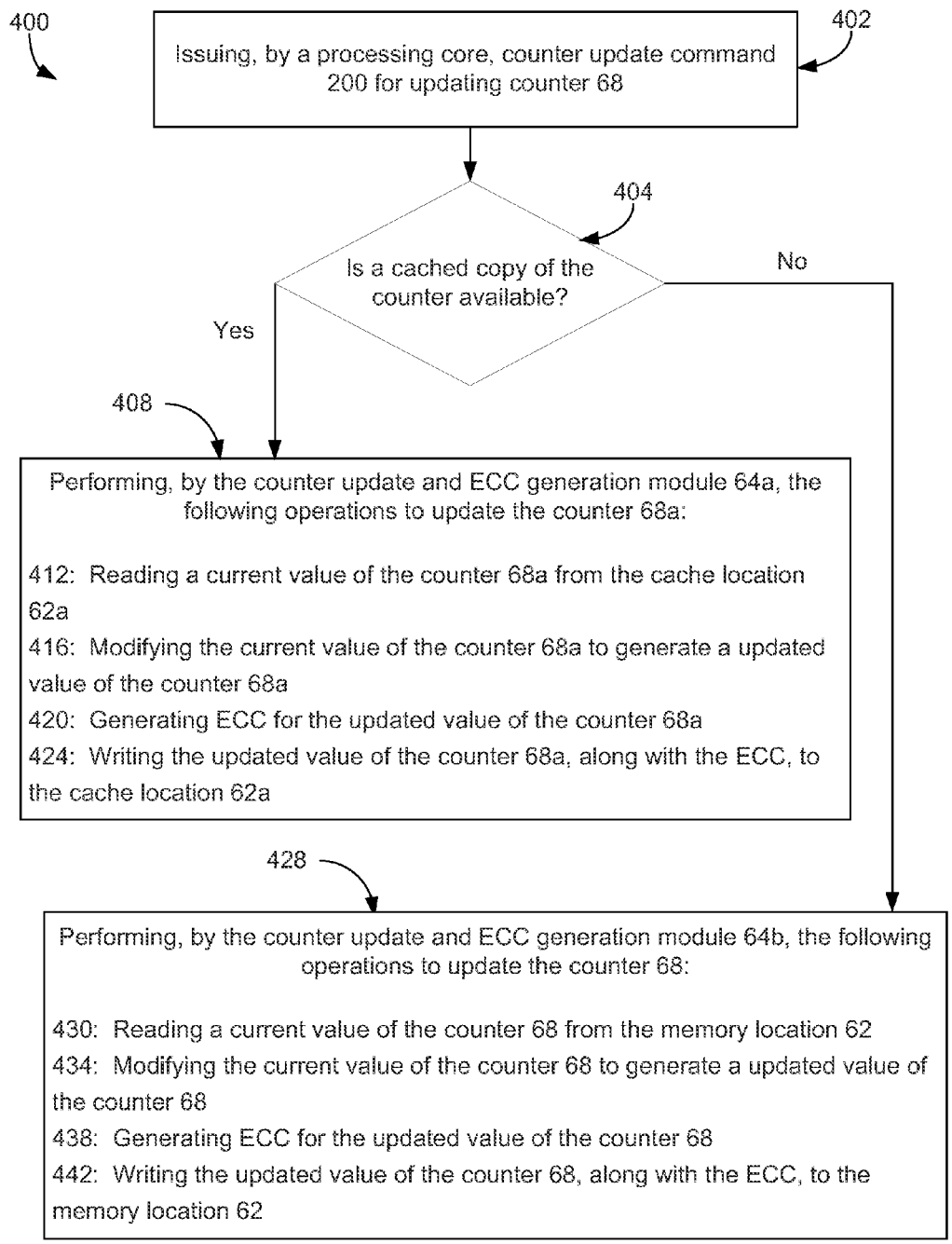
FIG. 4 is a flow chart illustrating an example method for operating the computing system of FIG. 1, in accordance with an embodiment of the present disclosure.

FIG. 4 is a flow chart illustrating an example method 400 for operating the computing system 100 of FIG. 1, in accordance with an embodiment of the present disclosure. At 402, one of the processing cores 20a, ..., 20c issues the counter update command 200 of FIG. 2 for updating the counter 68.

As previously discussed, the counter 68 is stored in the memory location 62, and a copy of the counter 68 can be cached, as counter 68a, in the cache data array 36 (e.g., in the cache location 62a). At 404, it is determined whether the cached counter 68a is available in the cache data array 36. For example, if the cached counter 68a is available in the cache data array 36, at 408, the counter update module 64a processes the counter update command 200 and updates the cached version of the counter 68 (i.e., updates the counter 68a). On the other hand, if the counter 68 is not cached in the cache data array 36, at 428, the counter update module 64b processes the counter update command 200 and updates the counter 68.

As illustrated in FIG. 4, if the cached counter 68a is available in the cache data array 36, at 412, the counter update module 64b (e.g., the read module 64a3) reads the current value of the counter 68a from the cache location 62a. At 416, the counter update module 64a (e.g., the execution module 64a2) modifies the current value of the counter 68a, based on the counter update command 200, to generate an updated value of the counter 68a. At 420, the counter update module 64a (e.g., the ECC generation module 64a4) generates the ECC for the updated value of the counter 68a. At 424, the counter update module 64a (e.g., the write module 64a5) writes the updated value of the counter 68a, along with the ECC, to the cache location 62a.

If the counter 68 is not cached in the cache data array 36, at 430, the counter update module 64b (e.g., the read module 64b3) reads the current value of the counter 68 from the memory location 62. At 434, the counter update module 64b (e.g., the execution module 64b2) modifies the current value of the counter 68, based on the counter update command 200, to generate an updated value of the counter 68. At 438, the counter update module 64b (e.g., the ECC generation module 64b4) generates the ECC for the updated value of the counter 68. At 442, the counter update module 64b (e.g., the write module 64b5) writes the updated value of the counter 68, along with the ECC, to the memory location 62.

In an embodiment, the operations at 408 (e.g., operations 412, . . . , 424) and/or the operations at 428 (e.g., operations 430, . . . , 442) are transparent to the processing core (e.g., processing core 20a) that issues the counter update command 200. That is, the counter update modules 64a and/or 64b update the counter in a manner that is transparent to the processing core 20a. The processing core 20a merely issues a single command (i.e., the counter update command 200) to update the counter. In an embodiment, the processing core 20a treats the counter update command 200 as a regular write command (e.g., a write command associated with writing to the counter), and does not perform any additional operations (e.g., does not issue a spinlock, a semaphore, or interrupts, as will be discussed in detail herein later) while issuing the counter update command 200.

Furthermore, the read, modify, generate and write operations (e.g., reading the current value of the counter, modifying to generate the updated value of the counter, generating ECC for the updated value of the counter, and writing the updated value of the counter and the ECC, e.g., associated with operations 412, . . . , 424, and/or with operations 430, . . . , 442 of method 400) are performed atomically by the counter update modules 64a and/or 64b. For example, while the counter update module 64a performs the read, modify, generate and write operations at 412, . . . , 424 on a counter (e.g., counter 68a) based on a command received from a processing core (e.g., processing core 20a), the processing core 20a or any other processing core cannot interrupt these operations and/or cannot access the counter 68a while these operations are being executed (as access to the cache location 68a is through the counter update modules 64a, which handles any request for accessing the cache location 68a only after completing the current update operation of the counter 68a).

Also, if two counter update commands are issued for the same counter by two different processing cores (e.g., processing cores 20a and 20b, or by the same processing core) substantially simultaneously, a counter update module (e.g., the counter update module 64a) handles such multiple counter update commands in a serial or pipelined fashion (e.g., handles a counter update command after completion of a previous counter update command), and handles each of the counter update commands atomically. Accordingly, even if the two counter update commands are issued almost substantially simultaneously, a counter update command does not affect or corrupt another counter update command.

A conventional ECC engine is generally configured to generate ECC atomically for data processed by the conventional ECC engine. It is noted that in general, an atomic operation involves read, modification and write operations. In an embodiment, the counter update module 64a in the ECC engine 60a (and/or the counter update module 64b in the ECC engine 60b) also performs atomic operations involving read, modification and write operations, e.g., while performing various operations of the method 400. In an embodiment, ECC engines 60a and/or 60b can be developed from a conventional ECC engine, without significant modification to the conventional ECC engine (e.g., by adding a decoding operation to decode counter update commands and an update operation for updating the counter values, on top of the operations generally performed by the conventional ECC engine).

In an embodiment, one or more of the processing cores 20a, . . . , 20c (e.g., a processing core issuing the counter update command 200) are, for example, 32 bit processing cores, while the counter 68 is a 64 bit counter (or, for example, a number of bits associated with the counter is more than a number of bits associated with the processing cores). However, in an embodiment, as the counter update is performed in the ECC engines 60a and/or 60b (which can be, for example, 64 bit wide), the mismatch between the bits associated with the processing core and the counter does not pose any additional challenge in updating the counter 68.

In an example, in a conventional computing system, when a conventional processing core needs to update a counter, the processing core generally reads the current value of the counter from the corresponding memory or cache location, modifies the current value to generate an updated value of the counter, and writes the updated value of the counter to the memory location. That is, to update the counter, the conventional processing core has to issue several commands. Also, for example, if the processing core is a 32 bit processing core and the counter is a 64 bit counter, then additional operations need to be carried out by the conventional processing core to update the counter. While all these operations are carried out by the conventional processing core to update the counter, a spin lock has to be issued by the processing core for the storage location (e.g., a memory or a cache location) in which the counter is stored, to implement a semaphore for the storage location, so that the storage location cannot be accessed by, for example, another processing core (or any other component) while the counter is being updated (e.g., in order to maintain a coherency of the counter). Issuance of a spin lock and implementation of a semaphore are time intensive operations, and also requires considerable processing power of the conventional processing core. Furthermore, the conventional processing core has to disable interrupts while the processing core is issuing several commands associated with updating the counter.

In contrast, in the embodiments disclosed herein and as previously discussed, a processing core (e.g., the processing core 20a) issues a single command (e.g., the counter update command 200) to update the counter 68. Although the counter update modules 64a and/or 64b implement several commands associated with updating the counter, such commands are transparent to the processing core 20a (or to any other processing cores). Also, as previously discussed, even if two counter update commands are issued for the same counter by two different processing cores (e.g., processing cores 20a and 20b) substantially simultaneously, the counter update modules 64a and/or 64b handles such multiple counter update commands in a serial or pipelined fashion. Thus, unlike a conventional system, the processing core 20a does not need to implement any spin lock or semaphore while the counter 68 is being updated (because of the use of the counter update modules 64a and/or 64b, which ensures that any other counter update command, issued by any other processing core, is processed only after completion of the current counter update command). Furthermore, as the processing core 20 issues only one command associated with updating the counter, the processing core 20 does not need to disable interrupts while updating a counter. In contrast, in a conventional system, as a processing core issues multiple commands to update a counter, the processing core has to disable interrupts to avoid any issuance of interrupts in between the multiple commands.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A system-on-chip (SOC) comprising:
   a plurality of processing cores; and
   a counter update module configured to:
      atomically update a value of a counter, based on a counter update command received from a processing core of the plurality of processing cores, the value of the counter being stored in a storage location;
      generate an error correction code (ECC) for the updated value of the counter; and
      write the updated value of the counter and the ECC to the storage location,
   wherein the counter update module is configured to prohibit individual processing cores of the plurality of processing cores from accessing the storage location while the counter update module updates the value of the counter.

2. The SOC of claim 1, further comprising:
   an ECC engine comprising the counter update module.

3. The SOC of claim 2, further comprising:
   a shared cache module comprising the ECC engine and a cache data array, wherein the storage location is a cache location in the cache data array.

4. The SOC of claim 1, wherein the atomically updating of the value of the counter is transparent to the processing core.

5. The SOC of claim 1, wherein:
   the processing core is a 32 bit processing core; and
   the value of the counter comprises 64 bits.

6. A system-on-chip (SOC) comprising:
   a plurality of processing cores; and
   a counter update module configured to:
      atomically update a value of a counter, based on a counter update command received from a processing core of the plurality of processing cores, the value of the counter being stored in a storage location,
      generate an error correction code (ECC) for the updated value of the counter, and
      write the updated value of the counter and the ECC to the storage location,
   wherein the counter update module comprises:
      a command decoding module configured to receive the counter update command, and to decode the counter update command to determine a type of the counter update command and one or more operands associated with the counter update command;
      a read module configured to read a current value of the counter from the storage location;
      an execution module configured to modify the current value of the counter to generate an updated value of the counter, based at least in part on the decoded counter update command;
      an ECC generation module configured to generate the ECC for the updated value of the counter; and
      a write module configured to write the updated value of the counter and the ECC to the storage location.

7. A system-on-chip (SOC) comprising:
   a plurality of processing cores;
   a first ECC engine comprising a first counter update module, the first counter update module configured to:
      atomically update a value of a first counter, based on a first counter update command received from a processing core of the plurality of processing cores, the value of the first counter being stored in a storage location,
      generate an error correction code (ECC) for the updated value of the first counter, and
      write the updated value of the first counter and the ECC to the storage location;
   a shared cache module comprising a cache data array;
   a memory controller configured to control a memory that is external to the SOC; and
   a second ECC engine included in the memory controller, the second ECC engine comprising a second counter update module that is configured to:
      receive a second counter update command, from the processing core, to update a value of a second counter that is stored in a memory location in the memory, wherein the value of the second counter is not cached in the shared cache module; and
      atomically update the value of the second counter based on the second counter update command.

8. A method comprising:
   issuing, by a first processing core of a plurality of processing cores, a counter update command to update a value of a counter;
   if the value of the counter is cached in a cache location of a cache data array, updating, by a first counter update and error correction code (ECC) generation module, the value of the counter based on the counter update command; and
   if a counter is not cached in the cache data array, updating, by a second counter update module, the value of the counter based on the counter update command,
   wherein said updating by the first counter update module further comprises
      decoding the counter update command to determine a type of the counter update command, a size of the value of the counter, and one or more operands associated with the counter update command.

9. The method of claim 8, wherein said updating by the first counter update module further comprises:
   reading a current value of the counter from the cache location;
   based at least in part on the counter update command, modifying the current value of the counter to generate an updated value of the counter; and
   writing the updated value of the counter to the cache location.

10. The method of claim 8, wherein said updating by the first counter update module further comprises:
    generating an ECC corresponding to the updated value of the counter; and
    writing the ECC to the cache location.

11. The method of claim 8, wherein said updating by the first counter update module further comprises:
    updating the counter through atomic operations.

12. The method of claim 8, wherein said updating by the second counter update module further comprises:
    reading a current value of the counter from a memory location in which the value of the counter is stored;

based at least in part on the counter update command, modifying the current value of the counter to generate an updated value of the counter;

generating an ECC corresponding to the updated value of the counter; and writing the updated value of the counter and the ECC to the memory location.

13. A method comprising:

issuing, by a first processing core of a plurality of processing cores, a counter update command to update a value of a counter;

if the value of the counter is cached in a cache location of a cache data array, updating, by a first counter update and error correction code (ECC) generation module, the value of the counter based on the counter update command; and if a counter is not cached in the cache data array, updating, by a second counter update module, the value of the counter based on the counter update command, wherein said updating by the first counter update module further comprises:

reading a current value of the counter from the cache location, based at least in part on the counter update command, modifying the current value of the counter to generate an updated value of the counter and writing the updated value of the counter to the cache location, and wherein the method further comprises prohibiting a second processing core of the plurality of processing cores from accessing the cache location while said reading, modifying, generating and writing is being performed.

* * * * *